(12) United States Patent
Fries et al.

(10) Patent No.: US 10,469,269 B2
(45) Date of Patent: Nov. 5, 2019

(54) ARRANGEMENT AND METHOD FOR OPERATING THE ARRANGEMENT CONTAINING A SUBSTATION AND AT LEAST ONE TERMINAL DEVICE CONNECTED TO IT

(71) Applicant: SIEMENS AKTIENGESELLSCHAFT, Munich (DE)

(72) Inventors: Steffen Fries, Baldham (DE); Jan Eh, Nuremberg (DE); Andreas Guettinger, Fuerth (DE); Marco Lambio, Roethenbach A. D. Pegnitz (DE)

(73) Assignee: Siemens Aktiengesellschaft, Munich (DE)

( * ) Notice: Subject to any disclaimer, the term of this patent is extended or adjusted under 35 U.S.C. 154(b) by 154 days.

(21) Appl. No.: 15/659,867

(22) Filed: Jul. 26, 2017

(65) Prior Publication Data

US 2018/0034645 A1  Feb. 1, 2018

(30) Foreign Application Priority Data

Jul. 26, 2016 (EP) .................................. 16181176

(51) Int. Cl.
*G06F 7/04* (2006.01)
*H04L 9/32* (2006.01)
(Continued)

(52) U.S. Cl.
CPC ............ *H04L 9/3268* (2013.01); *G06F 21/60* (2013.01); *H04L 9/007* (2013.01); *H04L 9/321* (2013.01);
(Continued)

(58) Field of Classification Search
None
See application file for complete search history.

(56) References Cited

U.S. PATENT DOCUMENTS

| 4,888,801 A | 12/1989 | Foster et al. |
| 2013/0290735 A1* | 10/2013 | Rombouts .............. G06F 21/33 713/189 |
| 2015/0324589 A1* | 11/2015 | Thanos .................. G06F 21/60 726/1 |

OTHER PUBLICATIONS

Kapidzic, N., et al. : "A Certificate Management System: structure, functions and protocols", Network and Distributed System Security,1995., Proceedings of the Symposium on San Diego, CA, USA Feb. 16-17, 1995, Los Alamitos, CA, USA,IEEE Comput. Soc, pp. 153-160, XP010134531, 1995.

* cited by examiner

*Primary Examiner* — Brandon S Hoffman
(74) *Attorney, Agent, or Firm* — Laurence Greenberg; Werner Stemer; Ralph Locher

(57) ABSTRACT

A method operates an arrangement having a substation and a terminal device connected to the substation. The terminal device is equipped with a terminal device certificate and a private key. The certificate enables a signed data transmission, indicates the substation as the certificate issuer, has a signature of the substation and contains a reference to a public key of the terminal device. Following a connection of a control station to the substation, the control station recertifies the public key of the substation by creating a signed certificate for the substation containing the public key of the substation, for the authentication of data which are or are intended to be transmitted from the terminal device to another terminal device. The terminal device certificate indicating the substation as the certificate issuer is transferred to the other terminal device and the certificate verification is carried out based on recertified public key.

11 Claims, 2 Drawing Sheets

(51) Int. Cl.
*G06F 21/60* (2013.01)
*H04L 29/06* (2006.01)
*H04L 9/00* (2006.01)

(52) U.S. Cl.
CPC .......... *H04L 9/3226* (2013.01); *H04L 9/3265* (2013.01); *H04L 63/10* (2013.01); *H04L 63/20* (2013.01)

ARRANGEMENT AND METHOD FOR OPERATING THE ARRANGEMENT CONTAINING A SUBSTATION AND AT LEAST ONE TERMINAL DEVICE CONNECTED TO IT

CROSS-REFERENCE TO RELATED APPLICATION

This application claims the priority, under 35 U.S.C. § 119, of European application EP 16181176.5, filed Jul. 26, 2016; the prior application is herewith incorporated by reference in its entirety.

BACKGROUND OF THE INVENTION

Field of the Invention

The invention relates to a method for operating an arrangement containing a substation and at least one terminal device connected to the substation. According to the method, the at least one terminal device is equipped with a terminal device certificate and a corresponding private key. The certificate enables a signed data transmission, indicates the substation as the certificate issuer, has a signature of the substation and contains a reference to a public key of the terminal device.

Arrangements of this type are known, for example, in the field of automation technology, particularly in the field of electrical energy distribution. In the last-mentioned case, the substation may, for example, form an energy distribution substation and the terminal device may form an electrical measurement, monitoring and/or protection device.

Communication is normally implemented in today's automation systems by open protocols such as, for example, Internet protocol (IP), transport control protocol (TCP), user datagram protocol (UDP), Hypertext transfer protocol (http) or constraint application protocol (CoAP). If security protocols are used in this context, these are usually based on asymmetric keys (digital certificate with a public key, private keys) in order to authenticate either the server or both participants. Digital certificates, e.g. according to the X.509 standard, can be used to authenticate persons, devices and software processes. The validity of a digital certificate of a communication partner can be checked. To do this, along with the check of the information in the certificate, the certificate path, as it is referred to in the technical language, inter alia, is evaluated in order to check whether the certificate originates from a trusted source. The certificate is acknowledged as valid if the certificate path ends with a root certificate which is stored as trusted (referred to in the technical language as the RootCA (Root Certificate Authority)). A set of trusted root certificates (referred to in the technical language as "trusted root CA") is normally stored in advance for the certificate validation. Every certificate in which the certificate path ends with a trusted root certificate can be accepted as trusted.

If the device configuration is changed, for example because the arrangement is extended, a change of RootCAs or a change in the hierarchy of the RootCAs may be required (resulting in a different certificate path).

SUMMARY OF THE INVENTION

The object of the invention is to indicate a method for operating an arrangement of the type described above which enables a connection of an additional control station at low cost.

It is thus provided according to the invention that, following the connection of a control station to the substation, the control station recertifies the public key of the substation by creating a signed certificate for the substation containing the public key of the substation. For the authentication of data which are or are intended to be transmitted from the at least one terminal device to another terminal device, to the substation and/or to the control station, the terminal device certificate indicating the substation as the certificate issuer is transferred to the other terminal device, to the substation and/or to the control station and the certificate verification of the terminal device certificate on the receiver side, i.e. on the terminal device side, the substation side and/or the control station side and/or the authentication of the data signed with the corresponding private key is/are carried out on the basis of the recertified public key of the substation.

A fundamental advantage of the method according to the invention is that no new terminal device certificates which take account of the circumstance of the connection of the control station need to be issued for the terminal devices since the public key of the substation can in fact be retained or can continue to be used due to the certificate issued by the control station, i.e. due to the recertification. The further use of the old terminal device certificates is possible even though, in the case of the old terminal device certificates, due to their previous history, the otherwise necessary root reference to the control station or a valid root certificate referring to the control station is missing; the continued use is possible according to the invention because the control station, which operates as the new root certificate authority due to the connection, confirms through the recertification of the substation(s) to all communication participants that the certificates issued earlier by the substation (or substations) should continue to be classified as trusted, even though these certificates are no longer complete in terms of the root certificate. Through the recertification, it is therefore advantageously also possible for terminal devices which are connected to different substations to communicate with one another using encryption and/or digital signatures on the basis of their old terminal device certificates, even though the terminal device certificates that are used originate from a time before the connection of the control station and therefore have no root certificate referring to the new control station.

The fact of the performed recertification is preferably made accessible to all communication participants through storage at a central storage location.

Before the connection of the control station to the substation, two or more terminal devices, referred to below as terminal devices of a first configuration type, can be connected to the substation, the terminal device certificate in the case of the terminal devices in each case indicating the substation as the certificate issuer and the certificate chain ends with the substation as the certificate issuer.

After the connection of the substation to the control station, certificates are typically issued for the substation by the control station as an additional instance. In the certificate verification and/or the signature verification in the case of data which are or have been transmitted from the terminal devices of the first configuration type, the verification of the certificate chain preferably continues to be carried out even after the connection of the control station, in each case only up to the substation as the certificate issuer of the terminal device certificates.

If a further terminal device is connected to the substation after the connection of the control station to the substation, it is advantageous if the further terminal device is equipped—before, during or after the connection—with a terminal device certificate which enables a signed data transmission, indicates the substation as the certificate issuer, has a signature of the substation and contains a reference to a public key of the terminal device. In other words, the further terminal device can be equipped with a terminal device certificate which corresponds to the terminal device certificates of the already previously connected terminal devices of the first configuration type.

The public key of the substation is in each case preferably already stored in the further device(s) which is/are connected to the substation after the control station has already been connected; alternatively, it is preferably stored there during or after the connection.

After the connection of the control station to the substation and a subsequent connection of at least one further terminal device to the substation, during the certificate verification and/or the signature verification in the case of data which are transmitted from the further terminal device to the control station, to the substation, to another further terminal device and/or to a terminal device of the first configuration type, the verification of the certificate chain is preferably carried out only up to the substation as the certificate issuer of the terminal device certificate.

In a further design of the method, it is provided that, after the control station has been connected to the substation, at least one terminal device, referred to below as a terminal device of a second configuration type, is connected to the substation, wherein the substation is or becomes indicated as the certificate issuer in the certification chain. The terminal device certificate furthermore preferably contains a substation certificate or reference is made to such a certificate containing the control station as the certificate issuer; it is thereby achieved that both an intermediate certificate containing the public key of the substation and a root certificate containing the public key of the control station is contained or referenced in the certificate chain.

If a terminal device of the second configuration type transmits a message provided with its terminal device certificate and/or signed with a private key corresponding to the terminal device certificate to another terminal device connected to the substation, in particular a terminal device of the first configuration type, it is advantageous if the terminal device receiving the message carries out the certificate verification on the basis of the intermediate certificate containing the public key of the substation and ignores the root certificate containing the public key of the control station during the authenticity check.

If a terminal device of the first configuration type transmits a message provided with its terminal device certificate and/or signed therewith to another terminal device connected to the substation, it is advantageous if the terminal device receiving the message carries out the certificate verification on the basis of the public key which is contained in the terminal device certificate chain indicating the substation as the certificate issuer or which it has stored locally.

If a terminal device of the first configuration type transmits a message provided with its terminal device certificate and/or signed with a private key corresponding to the terminal device certificate to a terminal device of the second configuration type, it is advantageous if the terminal device of the second configuration type carries out the certificate verification taking account of the public key which is contained in the terminal device certificate of the terminal device of the first configuration type, the terminal device certificate indicating the substation as the certificate issuer, and also on the basis of the public key of the substation which is already stored or referenced in the terminal device of the second configuration type.

If the validity of the terminal device certificates expires due to a predefined expiry date after the connection of the control station, it is advantageous if, when terminal device certificates are reissued, the interim connection of the control station is taken into account and terminal device certificates are created in which the respective substation is indicated as the certificate issuer in the certification chain. A substation certificate is contained in the terminal device certificate or reference is made to such a certificate containing the control station as the certificate issuer, and both an intermediate certificate containing the public key of the respective substation and a root certificate containing the public key of the control station are contained or referenced in the certificate chain.

An electrical energy distribution arrangement is preferably operated as the arrangement. In such a case, the substation preferably forms an energy distribution substation, the terminal device forms an electrical measurement, monitoring and protection device and the control station forms an energy distribution control station.

The invention furthermore relates to an arrangement with a substation and at least one terminal device connected to the substation. The at least one terminal device is equipped with a terminal device certificate which enables a signed data transmission, indicates the substation as the certificate issuer, has a signature of the substation and contains the public key of the terminal device.

It is provided according to the invention that a control station is connected to the substation. The control station having recertified the public key of the substation by signing the key as a certificate issued by it, and the at least one terminal device is designed in such a way that it signs data which are intended to be transmitted to another terminal device, to the substation and/or to the control station with its private key corresponding to the terminal device certificate and indicating the substation as the certificate issuer.

With regard to the advantages of the arrangement according to the invention, reference is made to the advantages of the method according to the invention explained above which apply accordingly to the arrangement.

The control station is preferably designed in such a way that it carries out the verification of the terminal device certificate on the control station side and/or the authentication of the data signed with the corresponding private key on the basis of the recertified public key of the substation.

Other features which are considered as characteristic for the invention are set forth in the appended claims.

Although the invention is illustrated and described herein as embodied in a method for operating an arrangement comprising a substation and at least one terminal device connected to it, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

For the sake of clarity, the same reference numbers are always used in the figures for identical or comparable components.

Figure 1:
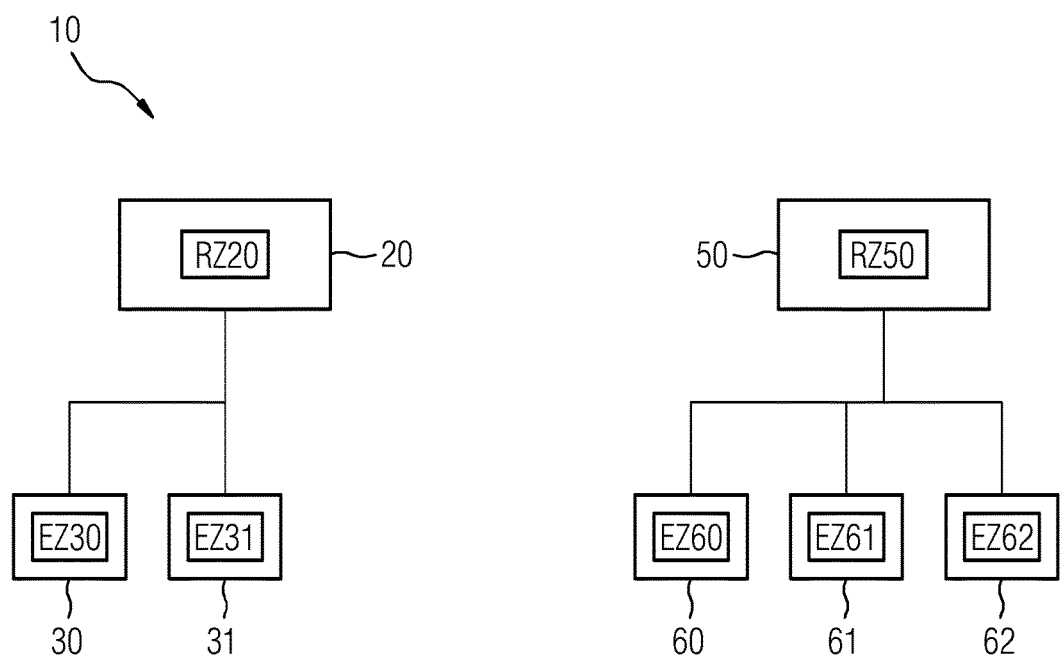
FIG. 1 is an illustration showing an arrangement with two substations separated from one another to which terminal devices are in each case connected according to the invention.

Referring now to the figures of the drawings in detail and first, particularly to FIG. 1 thereof, there is shown an arrangement 10 which contains a substation 20 and two terminal devices 30 and 31 connected to the substation 20. The terminal devices 30 and 31 are equipped in each case with a terminal device certificate EZ30 and EZ31 respectively and a corresponding private key, the certificate enabling a signed data transmission, indicates the substation 20 as the certificate issuer, has a signature of the substation 20 and contains a public key of the respective terminal device. The terminal devices 30 and 31 can communicate with one another and with their higher-order substation 20 in encrypted and/or in signed form by means of their terminal device certificates EZ30 and EZ31 and the corresponding private keys.

The arrangement 10 additionally has a further substation 50 to which the terminals 60, 61 and 62 are connected. The terminal devices 60 to 62 are equipped in each case with a terminal device certificate EZ60, EZ61 and EZ62 respectively and a corresponding private key. The certificate enabling a signed data transmission, indicates the substation 50 as the certificate issuer, has a signature of the substation 50 and contains a public key of the respective terminal device. The terminal devices 60 to 62 can communicate with one another and with their higher-order substation 20 in encrypted and/or in signed form by means of their terminal device certificates EZ60, EZ61 and EZ61 and the corresponding private keys.

Figure 2:
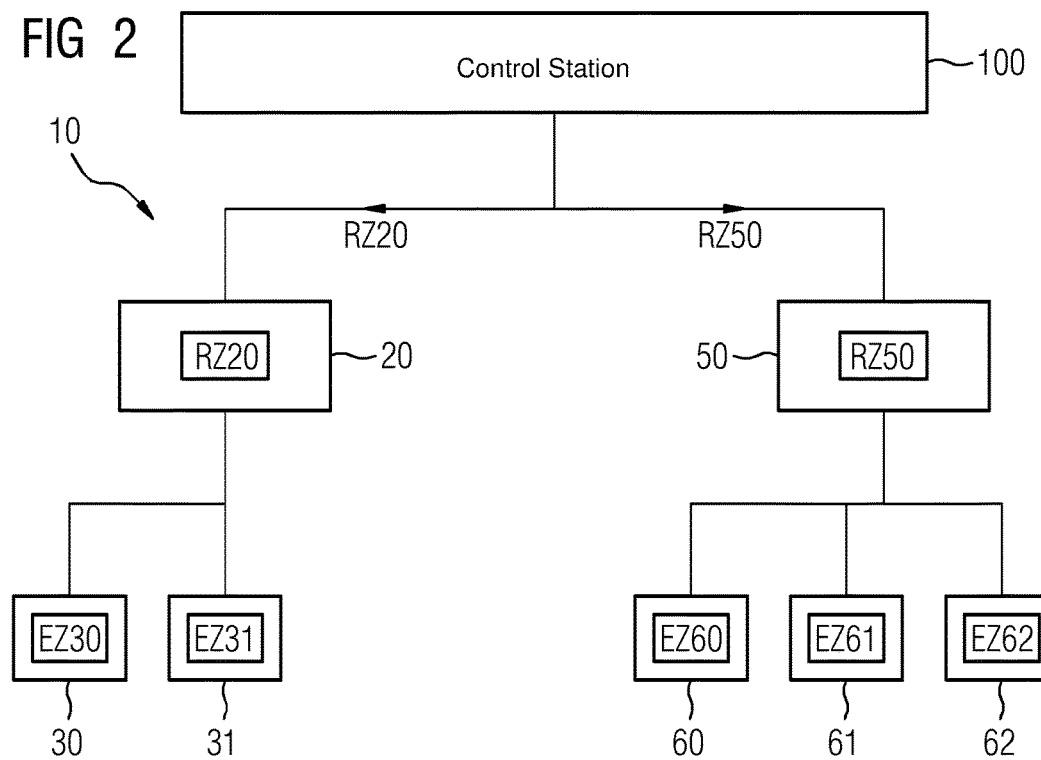
FIG. 2 is an illustration showing the arrangement according to FIG. 1 after a higher-order control station has been connected to the two substations.

FIG. 2 shows the arrangement 10 according to FIG. 1 after a control station 100 has been connected to the two substations 20 and 50. The procedure for enabling an encrypted and/or signed communication of the terminal devices 30 and 31 and also 60, 61 and 62 with the control station 10, their respective own and the respective other substation 20 and 50 and even with the terminal devices of the respective other substation is explained below with reference to an example embodiment.

Following the connection of the control station 100 to the substations 20 and 50, the control station 100 will in each case recertify the public key of the substations 20 and 50 by issuing a signed certificate RZ20 and RZ50, also referred to below as the recertified certificate RZ20 and RZ50, containing the public key of the substation, for the respective substation. The certificates RZ20 and RZ50 are preferably known and made accessible at a central location to all terminal devices and substations connected to the control station.

For the authentication of data which are transmitted or are intended to be transmitted, for example, from one terminal device 30, 31, 60-62 to another terminal device, to the substation 20 and 50 and/or to the control station 100, the recertification then enables continued use in each case of the old terminal device certificate EZ30, EZ31, EZ60, EZ61 and EZ62, since a certificate verification of the terminal device certificate EZ30, EZ31, EZ60, EZ61 and EZ62 on the receiver side, i.e. on the terminal device side, substation side and/or control station side, and/or the authentication of the data signed with the corresponding private key can be performed on the basis of the public key of the higher-order substation of the respective transmitter, i.e. by means of the respective recertified certificate RZ20 and RZ50.

In other words, it is not necessary to provide all terminal devices 30, 31, 60-62 immediately with new certificates adapted to the control station 100 only because of the connection of the control station 100 to the substations 20 and 50; this can be deferred until the respective validity period of the certificates that are still present or issued by the control station connection expires.

Figure 3:
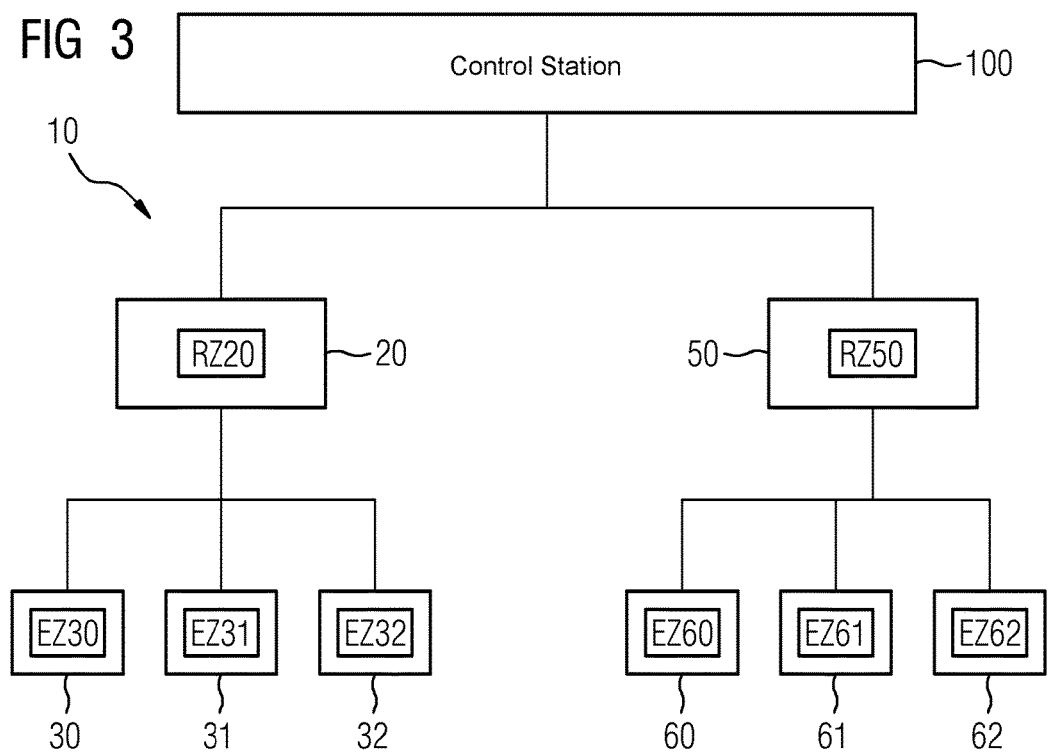
FIG. 3 is an illustration showing the arrangement according to FIG. 2 after a further terminal device has been connected to one of the two substations.

FIG. 3 shows the arrangement 10 according to FIG. 2 after a further terminal device 32 has been connected to the substation 20 following the connection of the control station 100. In order to enable a communication in encrypted and/or signed form, the terminal device 32 is equipped with a terminal device certificate EZ32 and a corresponding private key, the certificate enabling a signed data transmission, indicating the substation 20 as the certificate issuer, having a signature of the substation 20 and containing the public key of the respective terminal device 32. The terminal device certificate EZ32 thus corresponds in terms of structure to the terminal device certificates EZ30 and EZ31.

Due to the recertification of the substations 20 and 50 by the control station 100, it is possible for the new terminal device 32 to communicate with all other terminal devices 30, 31, 60 to 62, the substations 20 and 50 and the control station 100 by means of its purely substation-related terminal device certificate EZ32.

Figure 4:
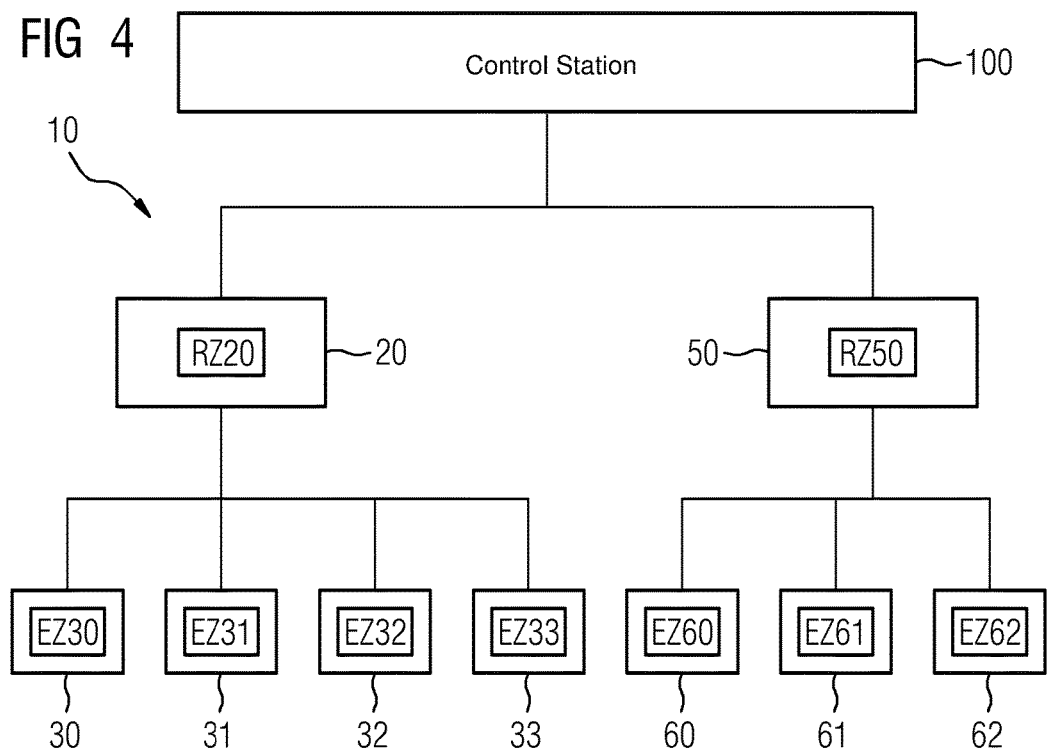
FIG. 4 is an illustration showing the arrangement according to FIG. 3 after another further terminal device, in fact a terminal device of the second configuration type, has been connected to one of the two substations.

FIG. 4 shows the arrangement 10 according to FIG. 3 after another further terminal device 33 has been connected to the substation 20 following the connection of the control station 100 and the terminal device 32. In order to enable a communication in encrypted and/or signed form, the terminal device 33 is equipped with a terminal device certificate EZ33 and a corresponding private key.

The substation 20 is indicated in the terminal device certificate EZ33 of the terminal device 33 as the certificate issuer in the certification chain. Unlike the case of the terminal device 32, the terminal device certificate EZ33 contains (or refers to) a substation certificate which contains the control station 100 as the certificate issuer. In other words, a certificate chain in which both an intermediate certificate containing the public key of the substation 20 and a root certificate containing the public key of the control station 100 are contained or referenced is defined in the terminal device certificate EZ33. The terminal device 33 is therefore a terminal device which has been designated above as a terminal device of the second configuration type.

If the terminal device 33 transmits a message provided with its terminal device certificate EZ33 and/or signed with a private key corresponding to the terminal device certificate to another terminal device 30 to 32 or 60 to 62, the terminal device receiving the message preferably carries out the certificate verification purely on the basis of the intermediate certificate containing the public key of the substation 20, i.e. the recertified certificate RZ20, and ignores the root certificate containing the public key of the control station 100 during the authenticity check. A procedure of this type saves processing time and processing power without incurring any loss of security.

The same applies accordingly if one of the terminal devices 30 to 32 or 60 to 62 transmits a message provided with its terminal device certificate and/or signed therewith to another terminal device 30 to 32 or 60 to 62; the terminal device receiving the message preferably carries out the certificate verification purely on the basis of the public key which is contained in the terminal device certificate chain indicating the respective substation 20 and 50 as the certificate issuer.

Although the invention has been illustrated and described in greater detail by means of preferred example embodiments, the invention is not limited by the disclosed examples and other variations may be derived herefrom by the person skilled in the art without departing from the protective scope of the invention.

The invention claimed is:

1. A method for operating a configuration containing at least one substation and at least one terminal device connected to the substation, which comprises the steps of:
    operating the configuration as an electrical energy distribution configuration;
    operating the substation as an energy distribution substation;
    operating the terminal device as an electrical measurement, monitoring and/or protection device;
    equipping the at least one terminal device with a terminal device certificate and a corresponding private key, wherein the terminal device certificate:
        enables a signed data transmission;
        indicates the substation as a certificate issuer;
        has a signature of the substation; and
        contains a reference to a public key of the terminal device;
    operating a control station as a energy distribution control station;
    following a connection of the control station as a new root certificate authority to the substation, the control station recertifies a public key of the substation by issuing a signed certificate containing the public key of the substation for the substation;
    performing an authentication of data which are to be transmitted from the at least one terminal device to another terminal device, to the substation and/or to the control station, the terminal device certificate which indicates the substation as the certificate issuer is transferred to the other terminal device, to the substation and/or to the control station; and
    carrying out a certificate verification of the terminal device certificate on a receiver side, a substation side and/or a control station side, and/or the authentication of the data signed with the corresponding private key on a basis of a recertified public key of the substation.

2. The method according to claim 1, wherein:
    before the connection of the control station to the substation, at least two terminal devices of a first configuration type, are connected to the substation, wherein the terminal device certificate in each case indicates the substation as the certificate issuer and a certificate chain ends with the substation as the certificate issuer; and
    after the control station has been connected to the substation, in the certificate verification and/or a signature verification in a case of data which are or have been transmitted from the terminal devices of the first configuration type, a verification of the certificate chain continues to be carried out even after the connection of the control station, in each case only up to the substation as the certificate issuer of the terminal device certificates.

3. The method according to claim 1, which further comprises:
    connecting at least one further terminal device to the substation after the control station has been connected to the substation; and
    equipping the at least one further terminal device before, during or after a connection, with a further terminal device certificate, the further terminal device certificate:
        enables a signed data transmission;
        indicates the substation as the certificate issuer;
        has a signature of the substation; and
        contains a reference to a public key of the further terminal device.

4. The method according to claim 3, wherein the public key of the substation is in each case already stored or is stored during or after the connection in of a further device which is connected to the substation after the control station has been connected.

5. The method according to claim 3, wherein after a connection of the control station to the substation and a subsequent connection of the at least one further terminal device to the substation, during a certificate verification and/or a signature verification in the case of data which are transmitted from the further terminal device to the control station, to the substation, to another further terminal device and/or to the terminal device of the first configuration type, a verification of a certificate chain is carried out only up to the substation as the certificate issuer of the further terminal device certificate.

6. The method according to claim 2, wherein:
    after the control station has been connected to the substation, at least one terminal device of a second configuration type, is connected to the substation;
    the substation is or becomes indicated as the certificate issuer in the certification chain in a terminal device certificate of the terminal device of the second configuration type;
    the terminal device certificate of the terminal device of the second configuration type contains a substation certificate or a reference to the substation certificate which contains the control station as the certificate issuer; and
    both an intermediate certificate containing the public key of the substation and a root certificate containing the public key of the control station are thus contained in the certificate chain.

7. The method according to claim 6, wherein:
    if the terminal device of the second configuration type transmits a message provided with the terminal device certificate of the terminal device of the second configuration type and/or signed with the private key corresponding to the terminal device certificate of the terminal device of the second configuration type to another terminal device connected to the substation and being of the first configuration type; and
    the terminal device receiving the message carries out the certificate verification on a basis of the intermediate certificate containing the public key of the substation and ignores the root certificate containing the public key of the control station in an authenticity check.

8. The method according to claim 6, wherein if a terminal device of the first configuration type transmits a message provided with the terminal device certificate and/or signed therewith to another terminal device connected to the substation, namely a terminal device of the second configuration type, the terminal device receiving the message carries out the certificate verification on a basis of the public key which is contained in the terminal device certificate chain indicating the substation as the certificate issuer or which it has stored locally.

9. The method according to claim 6, wherein:
if a terminal device of the first configuration type transmits a message provided with the terminal device certificate and/or the message signed with the private key corresponding to the terminal device certificate to a terminal device of the second configuration type, the terminal device of the second configuration type carries out the certificate verification taking into account:
the public key which is contained in the terminal device certificate of the terminal device of the first configuration type indicating the substation as the certificate issuer; and
on a basis of the public key of the substation which is already stored in the terminal device of the second configuration type.

10. An electrical energy distribution configuration, comprising:
at least one substation being an enemy distribution substation;
at least one terminal device connected to said substation and said at least one terminal device being an electrical measurement, monitoring and/or protection device, said at least one terminal device having a terminal device certificate and a corresponding private key, wherein said terminal device certificate:
enables a signed data transmission;
indicates said substation as a certificate issuer;
has a signature of said substation; and
contains a reference to a public key of the terminal device;
a control station connected to said substation as a new root certificate authority and functioning as an energy distribution control station, said control station having recertified the public key of said substation by signing said public key as a certificate issued by said control station; and
said at least one terminal device is configured such that said terminal device signs data which are intended to be transmitted to another terminal device, to said substation and/or said control station with the private key corresponding to the terminal device certificate, said terminal device certificate indicating said substation as the certificate issuer.

11. The configuration according to claim 10, wherein said control station carries out a verification of the terminal device certificate on a control station side and/or an authentication of the data signed with the corresponding private key on a basis of a recertified public key of said substation.

* * * * *